United States Patent [19]

Merle

[11] 4,431,146
[45] Feb. 14, 1984

[54] TAPE ENTRAINMENT DEVICE WITH A MOVABLE ENTRAINMENT ROLLER

[75] Inventor: Jean P. Merle, Clamart, France

[73] Assignee: Enertec, Montrouge, France

[21] Appl. No.: 327,298

[22] Filed: Dec. 3, 1981

[30] Foreign Application Priority Data

Dec. 12, 1980 [FR] France ................................ 80 26362

[51] Int. Cl.³ ...................... G11B 5/008; G11B 15/26; G11B 23/06
[52] U.S. Cl. .................................... 242/192; 242/199; 360/96.3
[58] Field of Search ............... 242/192, 199, 197, 198, 242/200, 201; 360/96.1, 96.2, 96.3, 96.4, 132

[56] References Cited

U.S. PATENT DOCUMENTS

| Re. 30,232 | 3/1980 | Wright | 242/200 X |
|---|---|---|---|
| 2,135,026 | 11/1938 | Becker | 242/200 X |
| 3,130,975 | 4/1964 | Proctor | 242/192 X |
| 3,722,829 | 3/1973 | Arnoldussen | 242/199 |
| 3,802,644 | 4/1974 | Maiershofer | 242/192 |
| 3,907,230 | 9/1975 | Merle et al. | 242/192 |
| 4,146,194 | 3/1979 | Majicek | 242/192 |
| 4,159,811 | 7/1979 | Grant | 242/192 |
| 4,219,169 | 8/1980 | Majicek | 242/192 |

FOREIGN PATENT DOCUMENTS

| 973145 | 8/1975 | Canada | 242/192 |
|---|---|---|---|
| 751075 | 6/1944 | Fed. Rep. of Germany . | |
| 706197 | 6/1931 | France . | |
| 1427665 | 1/1966 | France . | |
| 2142487 | 1/1973 | France . | |
| 2212981 | 7/1974 | France . | |
| 860272 | 2/1961 | United Kingdom . | |

Primary Examiner—Stuart S. Levy
Assistant Examiner—Scott J. Haugland
Attorney, Agent, or Firm—Dale Gaudier

[57] ABSTRACT

A tape entrainment device especially for a magnetic recorder, comprising a roller (11) tangential to the periphery of each of the reels (9 and 10) and an endless belt (12) which passes between the roller and the reels and engages an arc of the periphery of each of the latter.

The roller, which entrains the tape by friction by means of the belt on which it bears, is integral in rotation with an element (24 and/or 26) which is entrained on the one hand in rotation about its own axis and on the other hand is forced mechanically to move relative to the support along a circular path as close as possible to the path of the roller.

5 Claims, 12 Drawing Figures

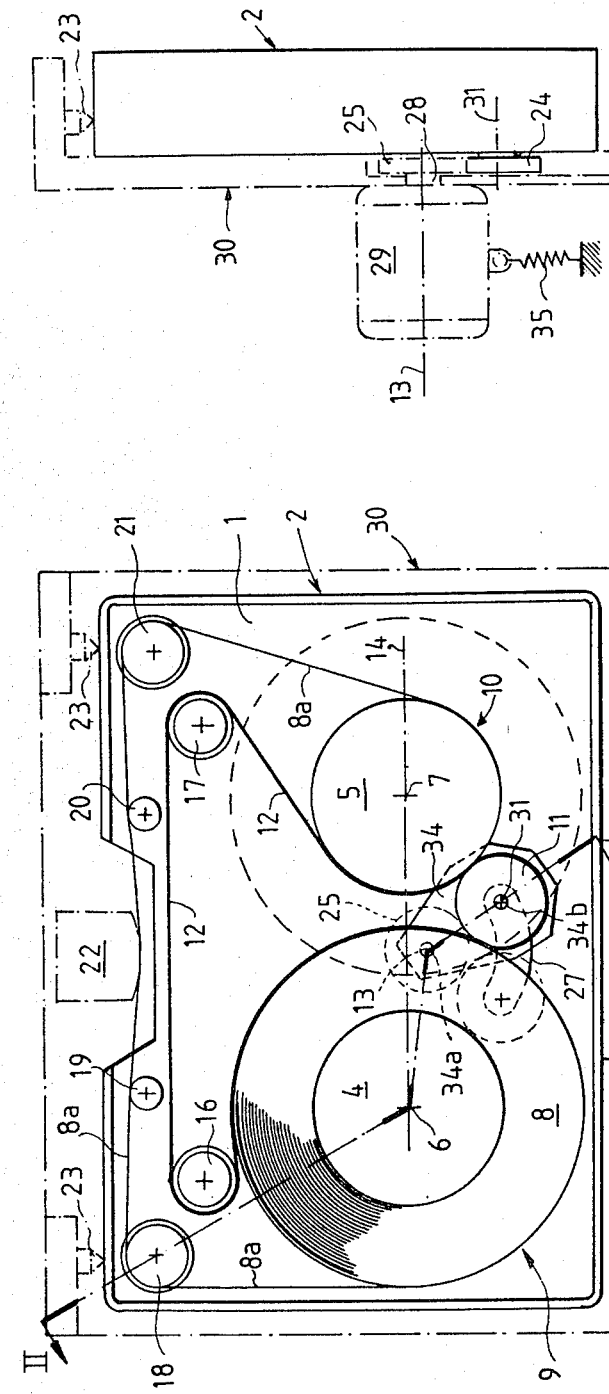
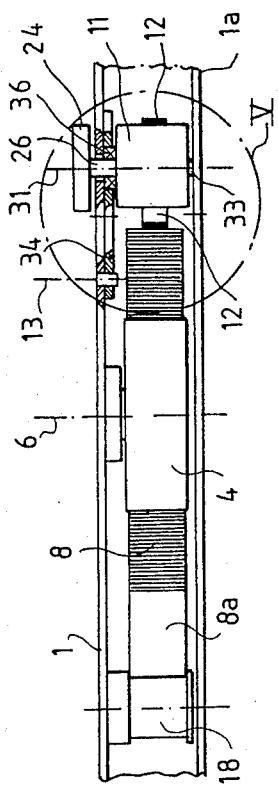
FIG. 2A
FIG. 2B
FIG. 2C

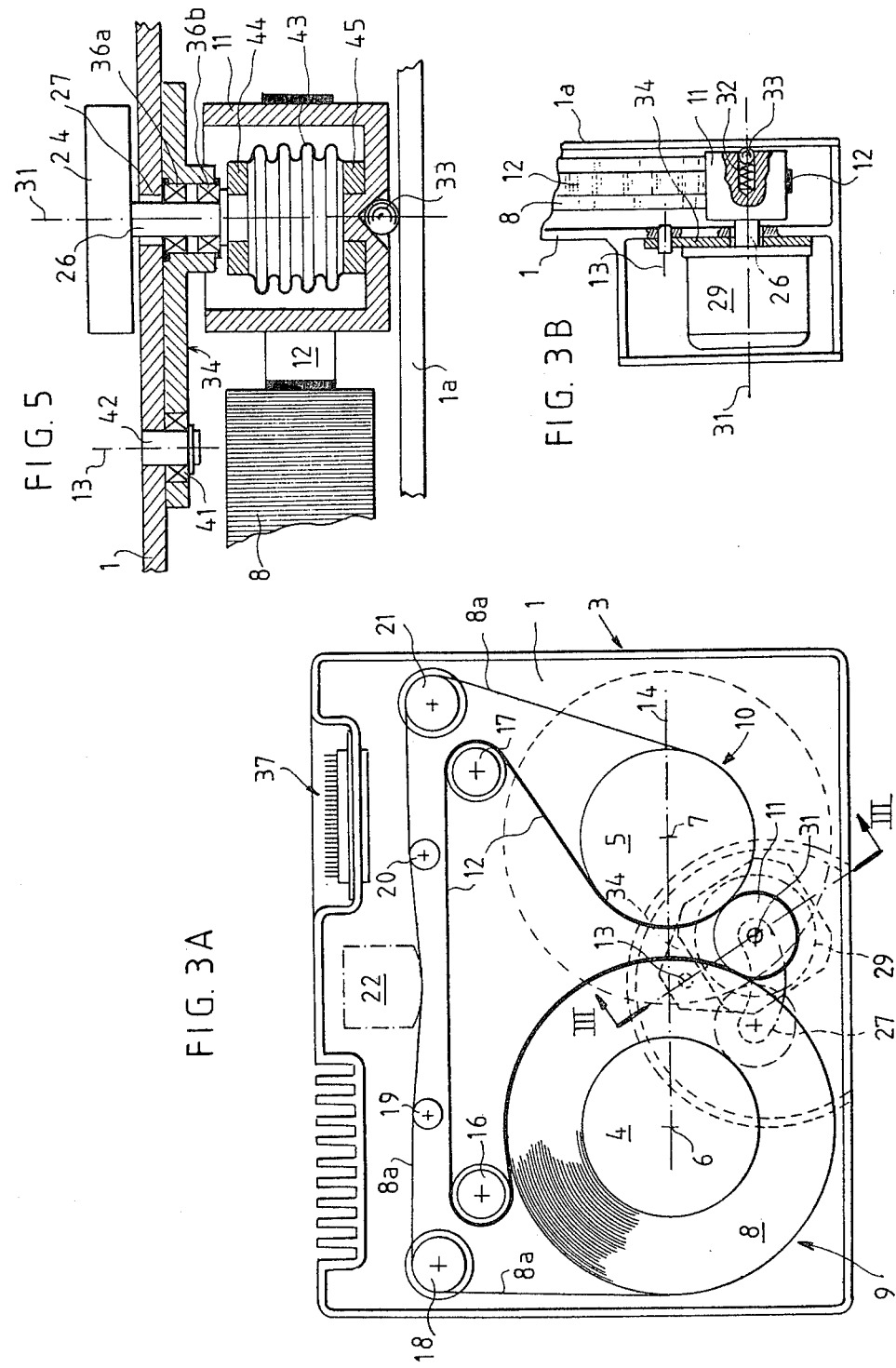

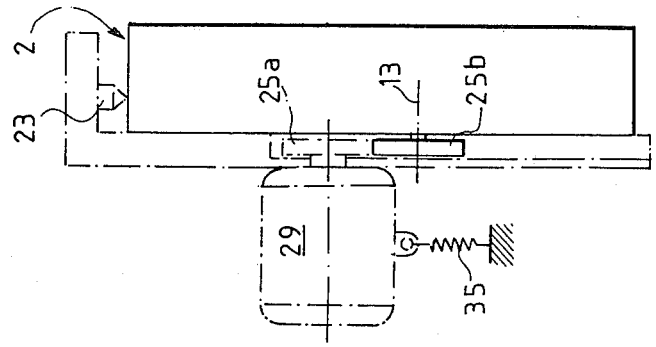
FIG. 4C
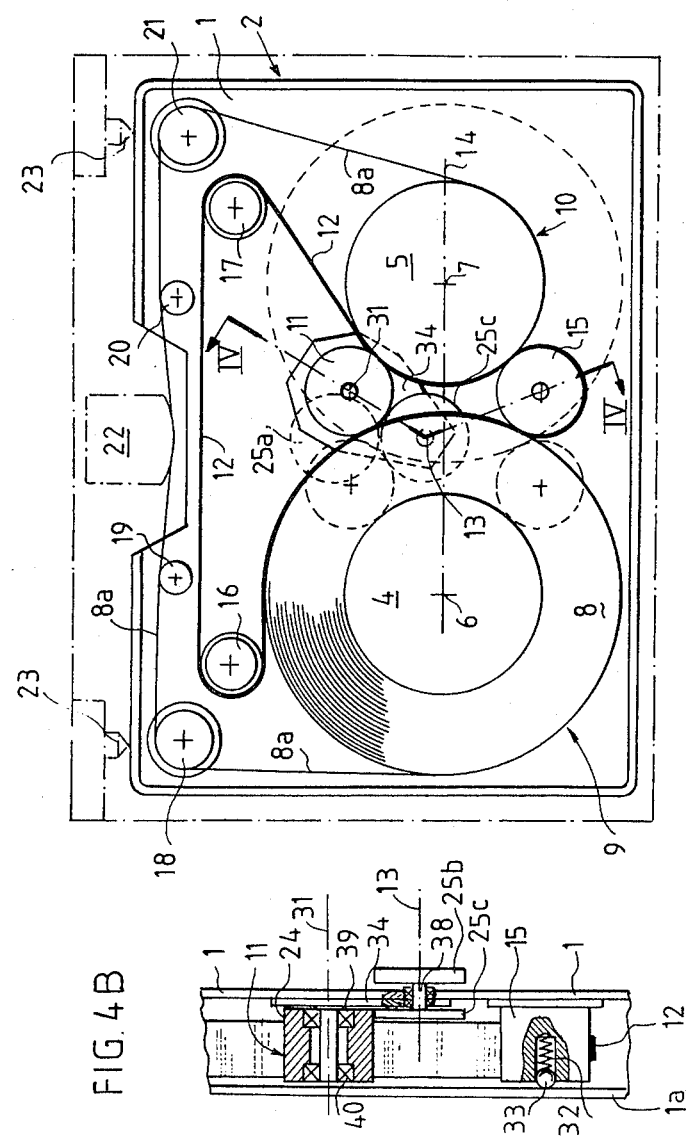
FIG. 4A
FIG. 4B

TAPE ENTRAINMENT DEVICE WITH A MOVABLE ENTRAINMENT ROLLER

BACKGROUND OF THE INVENTION

This invention relates to a tape entrainment device, more particularly for a magnetic recorder comprising: a support, two spools mounted to rotate in the same plane on the said support about two respective parallel axes; a tape encircling at least one of the spools—the tape and the two spools on which the tape may be wound forming two reels connected by means of an accessible portion of tape; a roller rotating in the same plane as the reels and at a tangent from the periphery of each of the said reels; and an endless belt which is tensioned and able to withstand some stretching, passing between the roller and the reels and engaging an arc of the periphery of each reel in order to ensure tensioning of the accessible portion of tape.

Devices of this type as described for example in French Patent No. 2212981 and U. S. Pat. No. 3,907,230 (J P Merle and C. Pavie) which could be referred to profitably have been widely used since they were invented a few years ago, particularly in the field of recording numeric data magnetically onto cassettes or cartridges, because of the important advantages they provide.

However, due to rapid improvements in and the ever increasing demands made of electronic components which cooperate in magnetic recording systems with the mechanical elements from which the tape entrainment devices are made, the limitations of these mechanical elements, which are slowing down technical developments in this field, have become apparent.

In this context the aim of this invention is to provide a system of entraining tape which can ensure reproducible and regular entrainment of the tape even when used in severe conditions, this being demonstrated in particular by a substantially constant tape tension.

SUMMARY OF THE INVENTION

In order to achieve this the device in accordance with the invention of the type described above is essentially characterised in that the roller rotates integrally with an element which is entrained in rotation about its own axis and which, during winding off from one reel on to the other, is forced mechanically to shift its position relative to the support along a circular path about an axis situated on the same side of said roller as a line joining the said spool axes, and in that said roller, which follows a path which is at least close to this circular path, forms the tape entrainment element and entrains the tape by friction by means of the said belt on which it bears.

In the majority of advantageous applications of the device in accordance with the invention, the belt passes around the tape entrainment roller and around at least one return roller mounted so as to rotate about a fixed axis relative to the support, on the other side of the line joining the axes of the spools from the said tape entrainment roller.

For example, the tape entrainment roller rotates integrally with an entrained disc which in turn is at least approximately coaxial and forms the entrained element, said disc being tangential to and entrained by a drive disc whose axis is identical to that of the said circular path.

The device may comprise an arm mounted to pivot on the support at a first point along its length about an axis which is identical to that of the said circular path, and the entrained element may be mounted to rotate about an axis parallel to that of the circular path which is fixed in relation to a second point along the length of this arm, the said circular path being defined by the movement of the second point during pivoting of the said arm about its first point.

In a simple and advantageous embodiment of the device in accordance with the invention, the entrained element and the tape entrainment roller are at least approximately coaxial and rotate integrally with each other by means of a connection which ensures transmission of the rotary motion even when the axes of the entrained element and the tape entrainment roller are offset, in the manner of an Oldham joint. This mechanical connection is preferably formed by a bellows joint which ensures homokinetic transmission of the rotary motion.

In the case where the device consists of an entrained disc and a drive disc, the entrained disc may be forced mechanically to follow its circular path simply by its sliding on the drive disc. In addition, when the belt passes about the tape entrainment roller the said roller can be maintained on its path engaging the reels by the force applied to it by the belt towards these reels. In the embodiment which exploits these two possibilities the entrained disc and the drive disc are preferably formed by pinions.

However, it is also possible for the entrainment element, with which the tape entrainment roller rotates integrally, to be a shaft entrained directly by a motor mounted on a pivoting arm, especially if the device is incorporated in a cartridge and comprises a pivoting arm mounted on the support.

In the majority of applications of the device in accordance with the invention, the support is a plate formed by a wall of a casing which forms a cassette or cartridge; the tape entrainment roller and its entrained disc or pinion can therefore be arranged at opposite sides of the said wall and connected by means of a shaft which can be displaced in a circular groove formed in the said wall.

The features stated above, give the device in accordance with the invention numerous advantages and possibilities. First of all the device ensures a substantially constant tension all the time when unwinding from one reel and winding onto the other; in addition this tension is largely independent of the direction of winding of the tape, i.e. there is not any appreciable change when the reel which is winding off becomes the reel which is winding on, and vice versa.

Taking the regular nature of entrainment into account and uniformity of the tape tension, it is possible to influence certain parameters such as the width of the belt, for example in order to adjust the tape tension to a desired value.

The tape entrained by the device in accordance with the invention has very good height stability; in other words the tape has a natural tendency to form cylindrical reels rather than conical reels of uncontrolled height. This feature makes it possible to guide the tape with very slight guidance at its edges so that there is very minimal wear on the tape as compared to the wear caused by the guides normally required in the known devices.

The device in accordance with the invention solves the standard and difficult problem of the parallel nature of the axes of the presser roller and the drive rollers used in conventional tape entrainment devices. In addition by eliminating the presser and drive rollers it is possible to increase the length of the accessible portion of tape with the same load on the cassette and to increase the number of magnetic heads and to move the entrainment motor away from the heads.

Since the entrainment roller is in contact with the two reels with only the thickness of the belt intervening, the time required to stop and start the tape is substantially reduced. This feature is of considerable importance because it relates to a reduction in a problem which affects the mechanical elements much more severely than the electronic elements, i.e. inertia.

The entrainment device in accordance with the invention has also been shown to be capable of taking up the loops which appears in the reels which are subjected to large variations in temperature. Indeed, it is known that the reels when subjected to cold for example, retract by forming corrugations separated by hollows or loops for which current entrainment devices are not normally able to compensate.

Finally the entrainment device according to the invention can easily be incorporated in cassettes or sealed cartridges.

BRIEF DESCRIPTION OF THE DRAWING FIGURES

Other features and advantages of the invention are clearly apparent from the description which follows by way of non-limitative example, with reference to the attached drawings, in which:

FIG. 2A is a plan view of a second embodiment of the device in accordance with the invention incorporated in a cassette;

FIG. 2B is a partial section in accordance with the arrows II—II of FIG. 2A in which only the hatched elements are seen in section, the roller 11 in particular not being shown in section;

FIG. 2C is an external side view of the cassette of FIG. 2A;

FIG. 3A is a plan view of a third embodiment of the device in accordance with the invention incorporated in a sealed cartridge;

FIG. 3B is a partial section along the lines III—III of FIG. 3A;

FIG. 4A is a plan view of a fourth embodiment of the device in accordance with the invention incorporated in a cassette;

FIG. 4B is a partial section in accordance with the arrows IV—IV of FIG. 4A;

FIG. 4C is an outer side view of the cassette shown on FIG. 4A; and

FIG. 5 is an enlarged sectional view of the elements shown inside the circle V of FIG. 2B and in particular of roller 11 in a fifth embodiment of the invention, the plan view, partial section and side view of which are otherwise identical to that of FIGS. 2A, 2B, and 2C.

The same reference numbers are used on the various Figures. to designate the same elements.

DESCRIPTION OF THE PREFERRED EMBODIMENTS

Figure 1C:
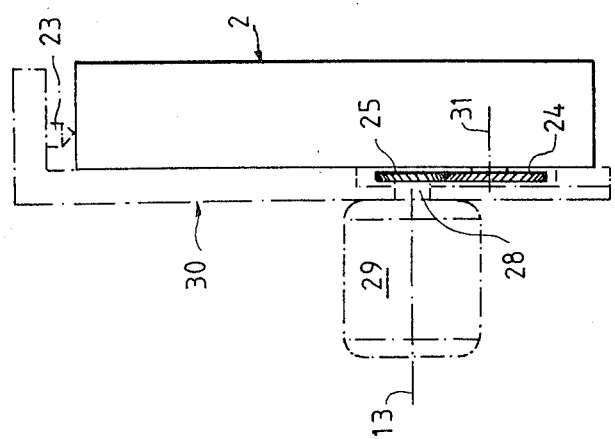
FIG. 1C is an external side view of the cassette of FIG. 1A.

The following are shown in the plan views 1A to 4A: a support or plate 1, comprising one wall of a cassette 2 (FIGS. 1A, 2A, 4A, 5) or a sealed cartridge 3 (FIG. 3A); two spools 4 and 5 mounted to rotate in the same plane as the support 1, about two respective parallel axes 6 and 7; a tape 8 wound on one or both spools and forming therewith two reels 9 and 10 connected by an accessible portion of tape 8a; a roller 11 rotating in the same plane as the reels and at a tangent to the periphery of each of these; and an endless belt 12 which is taut and is able to withstand some stretching, passing between the roller 11 and the reels 9 and 10 and coming to rest on a curve of the periphery of each of these reels. The roller 11 rotates integrally with an entrained element rotating about its own axis, such as an entrained disc 24, a shaft 26 or the two together. During winding off from one reel on to the other, this element 24, 26 or 24 and 26 is forced mechanically to move, by means which are described below, relative to the support, following a circular path, the axis 13 of which (perpendicular to the plane of the plan views) is located on the same side as the roller 11 in relation to a line 14 which joins the axes 6 and 7 of the spools 4 and 5. This roller 11 also follows the circular path or a quasi circular path very close thereto.

As shown in the various figures the belt 12 passes around a roller which is tangential to the periphery of each of the two reels, for example around the roller 11 (FIGS. 1A to 3A and 5), or around a roller with a sliding gear 15 (FIG. 4A) and in conventional manner on the return rollers 16 and 17 which are spaced from each other in a direction substantially parallel to the straight line 14 which joins the axes 6 and 7 of the spools 4 and 5. According to a known technique which has been used in practice in the prior art especially in the patents mentioned above, to which it would be advisable to refer, the resilient belt 12 cooperates with the roller 11 or 15 which is at a tangent to the two reels, the said belt passing round this roller in order to ensure that the accessible portion of the tape 8a is tensioned.

This accessible portion of tape 8a is guided by guide rollers 18, 19, 20, 21 in a manner also known, in order that it can be placed against a magnetic head 22 in front of which the said portion of tape is able to pass.

The magnetic head 22 is either a part of the recording and play back system (FIGS. 1A, 2A, 4A) using the cassette 2, the said cassette resting in it against the studs 23, or a part of the sealed cartridge 3 (FIG. 3A).

Assembly on the plate 1, of the spools 4, 5 and the various rollers 16 to 21 is implemented by standard means and these need not be described.

In addition the belt 12 may be made from materials currently in use in technology for this type of entrainment belt, especially elastomers which can be subjected to some stretching, e.g. approximately 10%. However, the device in accordance with the invention even makes it possible to use belts which can only withstand stretching of less than 5%.

In accordance with an important feature of the invention the roller 11 with its circular or quasi circular path forms the entrainment element for the tape 8. In order to do this the roller 11 which applies a pressure both to the belt 12 in all of the embodiments and via the belt 12 to the periphery of each of the reels 9 and 10, entrains the belt 12 by friction which in turn entrains the tape 8.

In the embodiments shown in FIGS. 1A to 1C and 2A to 2C, 4A to 4C and 5, the roller 11 with its circular or quasi circular path rotates integrally with an entrainment disc 24 which is at least approximately coaxial of this roller and which is tangential to and entrained by a drive disc 25 (25c in FIGS. 4A and 4B) which is mounted to rotate about the axis 13 which is that of the circular path of the entrained disc 24.

In the embodiment of FIGS. 4A to 4C the entrained disc 24 is simply formed by an axial extension of the roller 11 beyond its region used to ensure that the belt 12 carries out its entrainment function, so that the entrained disc 24 and the roller 11 form one piece.

However, in contrast to this in the embodiments of FIGS. 1A to 1C and 2A to 2C and 5 the tape entrainment roller 11 is made integral in rotation with the entrained disc 24 by means of the shaft 26 which is coaxial with the disc 24 and passes through the support or plate 1 and follows the circular movement of this disc 24 by moving in a curved groove 27 formed in the same plate 1.

In these embodiments the entrained disc 24 and the roller 11 are arranged on opposite sides of the plate 1 and the shaft 26 is entrained in rotation about its own axis and subjected to the circular path of the axis 13 as is the disc 24.

Figure 1A:
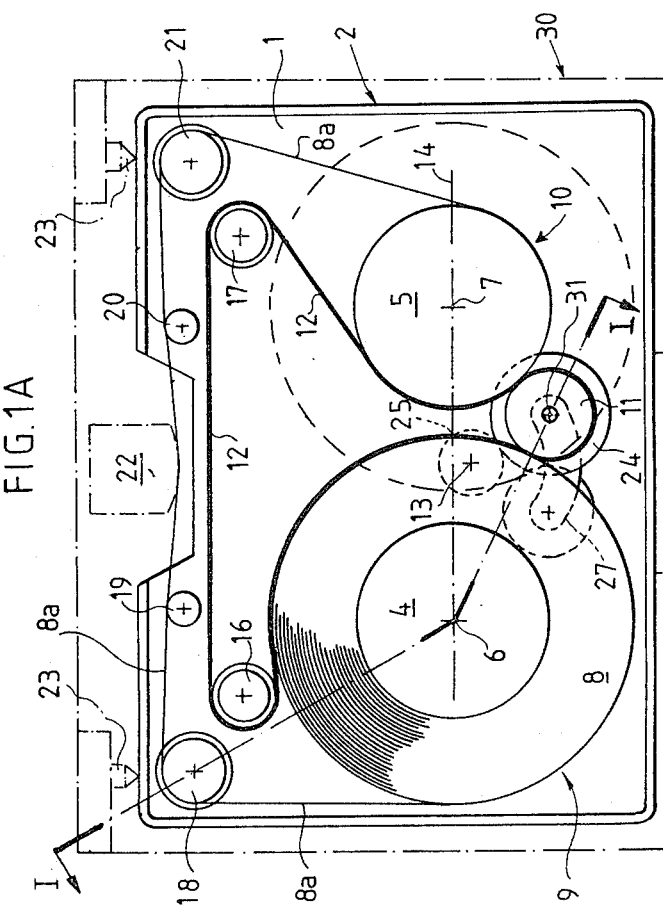
FIG. 1A is a plan view of a first embodiment of the device in accordance with the invention incorporated into a cassette.
Figure 1B:
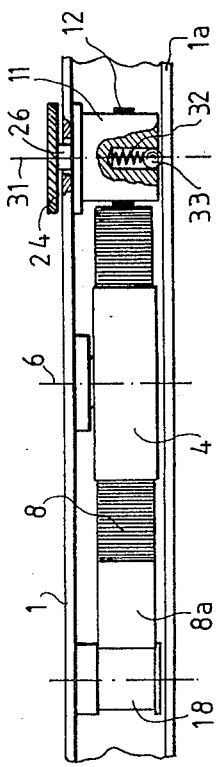
FIG. 1B is a partial section in accordance with the arrows I—I of FIG. 1A.

If reference is now made more specifically to FIGS. 1A to 1C it can be seen on the one hand that according to the embodiment shown there, the belt 12 passes around the roller 11 and on the other hand the said roller is coaxial of and rigidly connected, by means of the shaft 26, to the entrained disc 24 and therefore also follows a circular path, and in addition this same path is defined by the movement of the entrained disc 24 on the drive disc 25 and finally the entrained disc 24 and drive disc 25 are formed by meshing pinions.

To be more precise the drive disc or pinion 25 is supported by a shaft 28 which can be set in rotation by a motor 29 which is fixed in relation to the chassis 30 of the recording and reproduction system into which the cassette 2 is inserted so as to abut the chassis studs 23, which have already been mentioned. The roller 11 rests on the reels 9 and 10 as a result of the force applied to it by the belt 12 which partially surrounds it and the entrained disc or pinion 24 is itself applied to the drive disc or pinion 25 by the same force. While one reel winds on and the other winds off, the axis 31 of the entrained pinion 24 rotates about the axis 13 of the drive pinion 25 and the shaft 26 moves in the circular groove 27; as the pinions 24 and 25 remain enmeshed and at a tangent, the path of the axis 21 of pinion 24 is a circle.

The entrainment of roller 11 by pinions 24, 25 has a significant advantage in that it makes it easy to eliminate any play which may arise either from the fact that the roller 11 has a large clearance which makes it more difficult to impose a circular path on this roller or from deformation of the cassette, cartridge or its constituent parts as a result of changes in temperature.

While the belt 12 passes around the entrainment roller 11 the return rollers 16 and 17 are arranged in relation to the said roller 11 on the other side of the line 14 joining the axes 6 and 7 in order to increase the length of the curve of the periphery of each of the reels 9 and 10 on which the belt is in contact with the tape.

As can be seen from FIG. 1B, the tape entrainment roller 11 can be guided in its path by and between the plate 1 on the one hand and the face 1a of the cassette opposite to the plate 1 on the other hand. In order to achieve this the roller 11 is provided for example with an axially cylindrical chamber which houses a spring 32 and a ball bearing 33 which rolls against the opposite face 1a of the cassette 2.

As mentioned above FIGS. 2A to 2C are common to a second and to a fifth embodiment of the invention. The second embodiment will be described with reference to FIGS. 2A to 2C and the features of the fifth embodiment will be described with reference to FIG. 5.

If FIGS. 2A to 2C are referred to more specifically, it will be noted that the second embodiment has essentially two differences from the first embodiment described above, namely that on the one hand the circular path of the entrained disc 24 and the shaft 26 is defined by an arm 34 which is mounted so as to pivot at a first point 34a along its length about the axis 13 of the circular path and on the other hand the drive disc 25 entrains the entrained disc 24 by friction and not by meshing with it.

It should be noted that it would be possible nevertheless to define the circular path by means of a pivoting arm 34 while retaining the pinion form of the entrained disc 24 and drive disc 25 instead of the friction discs.

In the second embodiment the arm 34 is mounted so as to pivot on the plate 1 about the axis 13 of the circular path in accordance with any one of the conventional techniques available, and the entrained disc 24 and the shaft 26 are mounted to rotate about the axis 31 which is parallel to the axis 13 and is fixed in relation to a second point 34b of the pivoting arm 34. As FIG. 2C shows the drive disc 25 is biased towards the entrained disc 24 by a resilient force shown symbolically by a spring 35 which acts on the motor 29 in the desired direction, said motor being mounted to float slightly in relation to the chassis 30.

In this second embodiment the roller 11 is coaxial of and rigidly connected to the shaft 26 and the entrained disc 24 so that it follows the circular path of axis 13. In FIG. 2B for example this roller 11 is mounted on the arm 34 by engagement of the shaft 26 in a bearing 36 which is integral with this arm. On the other hand the roller 11 has a chamber receiving a spring and a ball bearing 33, as before, capable of rolling on the face 1a of the cassette 2, i.e. in partial section it would be like the roller 11 of the first embodiment shown in FIG. 1B.

FIGS. 3A and 3B relate to the case where the device of the invention is incorporated in a sealed cartridge 3. In this embodiment the magnetic head 22 and the motor 29 are arranged inside the case formed by the cartridge and the said cartridge consists of an assembly 37 of electrical connecting pins which make it possible to inject into the cartridge the electrical energy required for operation of the motor, to inject electrical write signals which are designed to be transformed by the head 22 into information recorded on the tape and pick up electrical read signals generated by the head 22 in response to the information already recorded on the tape. Specialists in this field will realise that the pins 37 are connected to the head 22 and the motor 29 by electrical conductors which for the sake of clarity have not been shown on the drawings.

As can be seen in FIG. 3B the roller 11 still provided with a chamber receiving a spring 32 and a ball bearing 33 and forced to follow a circular path for axis 13 by means of a pivoting arm 34 and integral in rotation with a coaxial shaft 26 which can be moved in a circular groove 27 formed in the plate, is rotated about its own axis by the motor 29 which is mounted directly on the pivoting arm coaxially of the roller 11 and directly driving the shaft 26.

The fourth embodiment of the invention shown in FIGS. 4A to 4C differs essentially from the second embodiment (FIGS. 2A to 2C) in that the belt 12 does not pass round the tape entrainment roller 11 but round a conventional sliding gear roller 15. In the fourth embodiment, tensioning of the accessible portion of tape 8a is ensured by the sliding gear roller 15 and the belt, while the roller 11 only ensures entrainment of the tape.

As FIGS. 4B and 4C show this embodiment in fact uses three discs 25a, 25b and 25c which are of the "friction" type.

The discs 25b and 25c (FIG. 4B) are coaxial and integral in rotation and arranged on opposite sides of the plate 1 and are connected by a shaft 38 which is arranged on the axis 13 of the circular path of the roller 11 and passes through the plate 1 at the point of this axis.

The disc 25c which forms the drive disc for the roller 11 abuts the axial extension of this roller which forms the entrained disc 24. The roller 11 is mounted so as to rotate by means of bearings 39, 40 on the axis 31, which is fixed in relation to the arm 34, said arm in turn being mounted to pivot on the plate 1, as in the second and third embodiments, about the axis 13 of the circular path. Finally, as FIG. 4B shows, the sliding gear roller is guided in its path as is the roller 11 in FIG. 1B.

FIG. 5 shows as the fifth embodiment a modification which can be applied in a number of cases, particularly in all those cases where a circular path is defined by a pivoting arm 34 and where the belt 12 passes round the entrainment roller 11. In FIG. 5 the majority of elements described with reference to FIG. 2B are to be found.

However, the larger scale of FIG. 5 shows that the bearing 36 is in fact an assembly of two bearings 36a and 36b which are mounted in a cylindrical part of the shaft 34 and that the latter is also mounted to pivot by means of another bearing 41 mounted on a spindle 42 which is coaxial with the axis 13 and integral with the plate 1.

It should be noted, for FIG. 2B as well as for FIG. 5 that if the roller 11 does not appear to be tangential to the reel shown in section this is simply because the section line does not pass through the tangent point, in contrast to the case of FIG. 1B.

In FIG. 5 the roller 11 no longer has a cylindrical chamber receiving a spring 32 and a ball bearing 33, but rather a conical chamber merely receiving the ball bearing 33. However the essential originality of the fifth embodiment resides in the fact that the roller 11 is hollow and consists of a mechanical connection 43 which makes it possible to transmit to the entrainment roller 11 the rotary motion of the entrained disc 24 and of the shaft 26 even if the roller 11 is not exactly coaxial of the entrained disc 24 (i.e. also of shaft 26 since this shaft and the entrained disc are coaxial). This mechanical connection, which therefore operates like an Oldham joint, can be formed by such a joint. However as FIG. 5 shows this connection is preferably formed by a bellows joint which ensures homokinetic transmission of the rotary motion. This joint is fixed to flanges 44 and 45, which are respectively integral with the shaft 26 and the roller 11, and is formed by a flexible joint in nickel or stainless steel such as those made by the companies ACME or PIC.

In accordance with what has been stated above, a joint of this type can also be used, for example, to make the shaft 26 and the roller 11 integral in rotation in the third embodiment (FIG. 3B) while not forcing the roller 11 to follow a strictly circular path and allowing it to move in an only quasi circular path.

Although the description has not up to now made any assumption as to the relative dimensions of the component parts of the device of the invention, it should be noted that the position of the axis of rotation 13 or the useful length of the pivoting arm 34, i.e. the distance separating the points 34a and 34b cannot be selected arbitrarily.

To be more precise, referring again to FIG. 1A, if it is assumed that:

$R_0$ is the radius of a reel of minimum radius for example that of the empty reel 10

$R_1$ is the radius of a reel of maximum radius for example that of the full reel 9 r is the radius of the tape entrainment roller 11 increased by the thickness of the belt 12 d is half the distance between the axes 6 and 7 of the reels 9 and 10 h is the distance between the axis 13 of the circular path and the straight line 14 which joins the axes 6 and 7, l is the distance between the axis 13 of the circular path and the axis 31 of rotation of the roller 11 about its own axis x represents the expression:

$$\sqrt{\left(\sqrt{\frac{R_0^2 + R_1^2}{2}} + r\right)^2 - d^2}$$

Y represents the expression:

$$\frac{(R_1 + r)^2 - (R_0 + r)^2}{4d}$$

Z represents the expression:

$$\sqrt{(R_1 + r)^2 - (d + Y)^2}$$

if one chooses spools 4 and 5 which have the same radius, and if the axis 13 of the circular path is placed at the same distance from axes 6 and 7 of spools 4 and 5 it is necessary to give values which satisfy the following equations to the distances h and l:

$$h = \frac{Y^2 + Z^2 - X^2}{2(Z - X)} \text{ and } l = X - h$$

It is also possible but not indispensible to discover a new relationship which relates the distance d and the radii $R_0$ $R_1$, and r by numeric techniques which require an automatic calculator, while considering the distance d as a variable parameter.

In order to do this two other radii $R_2$ and $R_3$ are selected besides $R_0$, $R_1$ and r such that:

$R_0 < R_2 < R_1$ and $(R_0)^2 + (R_1)^2 = (R_2)^2 + (R_3)^2$

The magnitude $h_m$ which corresponds to the magnitude h but in which $R_2$ replaces $R_0$ and $R_3$ replaces $R_1$ is calculated and one seeks, while applying optimisation techniques which are well known, the value of the parameter d for which the function $(h_m - h)^2$ has its minimum value. This value for the parameter d having been adopted the distances h and l are calculated by the equations given above.

I claim:

1. In a magnetic recorder of the type including: a support; two spools mounted to rotate in the same plane on the support about two respective parallel axes; a tape encircling at least one of the spools, the tape and the two spools on which the tape can be wound forming two reels connected by an accessible portion of tape; a tape drive roller rotating in the same plane as the reels and tangentially to the peripheries thereof; and an endless belt, which is taut and able to withstand some stretching, passing between the roller and the reels and engaging an arc of the periphery of each of these reels in order to ensure tensioning of the accessible portion of tape;

means for driving said tape comprising:

a rotatably driven disc rigidly attached to and coaxial with said tape drive roller, said disc being tangential to and driven along its periphery by a drive disc, said drive disc having an axis of rotation situated on the same side of a line joining said spool axes as is said tape drive roller, said driven disc being arranged such that during winding off of said tape from one reel to the other said driven disc is forced mechanically to shift its position relative to the support along a circular path, whose axis is defined by the axis of said drive disc, said mechanical shifting of said driven disc being constrained by the movement of the periphery of the driven disc on said drive disc and by the force applied by the belt to said tape drive roller in the direction of the reels so as to cause said tape drive roller to follow a path approximating said circular path and to thereby frictionally drive the tape by means of said belt against which said tape drive roller bears.

2. A tape drive in accordance with claim 1 wherein said belt passes around said tape drive roller and around at least one return roller, mounted so as to rotate about an axis which is fixed in relation to the support, and on the other side of said line joining the spool axes from said tape drive roller.

3. A tape drive according to claim 1 wherein said driven disc and said drive disc are formed by pinions.

4. A tape drive according to claim 1 wherein said support is a plate which forms a wall of a case forming a cassette or cartridge.

5. A tape drive according to claim 4, wherein said tape drive roller and said driven disc are arranged on opposite sides of said wall and are connected by a shaft which is movable in a circular groove formed in this wall.

* * * * *